(12) United States Patent
Luck et al.

(10) Patent No.: US 6,258,393 B1
(45) Date of Patent: Jul. 10, 2001

(54) METHOD AND DEVICE FOR CHANGING THE FUNCTIONAL FEATURES, WITH NO ALTERATION THEREOF, OF A PROTEIN PREPARATION

(75) Inventors: Thomas Luck; Thomas Pfeiffer, both of München; Andreas Waesche, Langenbach, all of (DE)

(73) Assignee: Fraunhofer Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/424,297

(22) PCT Filed: May 24, 1998

(86) PCT No.: PCT/DE98/00865

§ 371 Date: Feb. 16, 2000

§ 102(e) Date: Feb. 16, 2000

(87) PCT Pub. No.: WO98/52426

PCT Pub. Date: Nov. 26, 1998

(30) Foreign Application Priority Data

May 20, 1997 (DE) .............................................. 197 21 079

(51) Int. Cl.⁷ .................... A23L 3/00; A23J 1/14
(52) U.S. Cl. .................... 426/241; 426/244; 530/370; 530/377; 530/378
(58) Field of Search .................... 426/244, 241; 530/370, 377, 378

(56) References Cited

U.S. PATENT DOCUMENTS

| | | | |
|---|---|---|---|
| 4,091,119 | * 5/1978 | Bach | 426/234 |
| 4,853,238 | * 8/1989 | Huang | 426/241 |
| 5,612,076 | * 3/1997 | Samimi et al. | 426/234 |
| 5,976,592 | * 11/1999 | Polato | 426/241 |
| 6,010,727 | * 1/2000 | Rosenthal | 426/240 |

\* cited by examiner

*Primary Examiner*—Nina Bhat
(74) *Attorney, Agent, or Firm*—Antonelli, Terry, Stout & Kraus, LLP

(57) ABSTRACT

The invention relates to a method and device for changing the functional features, with no alteration thereof, of a protein preparation, preferably isolates or concentrates from plant seed-based proteins. The inventive method consists in heating a proteinic preparation for producing perishable or dry products as a starting material or component for protein-containing foodstuff. According to the invention, the proteinic preparation is exposed to a high frequency electromagnetic field, so that, due to evenly distributed temperature, the total volume of the proteinic preparation is heated.

20 Claims, 1 Drawing Sheet

METHOD AND DEVICE FOR CHANGING THE FUNCTIONAL FEATURES, WITH NO ALTERATION THEREOF, OF A PROTEIN PREPARATION

This application claims benefit under 35 U.S.C. 371 of PCT/DE98/00865, filed May 24, 1998.

TECHNICAL FIELD

The present invention relates to a process and a device for gentle modification of functional properties of a protein preparation, preferably of protein isolate or concentrate from vegetable seeds, by heating the protein preparation, for the production of fresh or dry products as a base material or an additive for protein-containing foodstuffs.

STATE OF THE ART

In order to utilize proteins, preferably for the production of foodstuffs, naturally occurring proteins have to first be extracted from their natural occurrence and, depending on the application, have to be treated to determine their functional properties, such as for instance their water-binding properties, dispersive power and oil-binding behavior, just to name a few, in a specific manner.

As is well-known, vegetable proteins are obtained as protein concentrates or protein isolates by means of extraction from the vegetable seeds. Principally, solvents, which in the case of the extraction of protein concentrates usually are aqueous, alcoholic solutions or water, are used to extract proteins from vegetable seeds; whereas in the extraction of protein isolates, saline solutions or water containing additives of alkaline solutions, for example NaOH, or water containing additives of acids, for example HCl, are usually employed. Known extraction methods are described in D. K. Salunkhe's book "World Oilseed", Chemistry, Technology and Utilization", 1992, New York.

FIG. 2 shows in a flow chart two alternative prior art processes for the extraction of protein concentrates and protein isolates. From an oil or protein raw material, such as for instance soybean, the oil is extracted from the protein raw material after grinding, pressing and/or hexane extraction in such a manner that the residue is a protein-rich flour. The left branch of the process of FIG. 2 shows known procedures for extracting protein concentrates. The protein-rich flour is extracted while adding aqueous, alcoholic solvents so that a wet protein concentrate containing up to 80% extract parts is yielded. In this manner the obtained, wet protein concentrate can be further treated by adding other reagents or introducing mechanical energy by grinding and/or stirring or by heating in order to alter the properties of the protein concentrate. In order to obtain the desired protein concentrate in a, for the most part, dry state, drying steps are provided which usually occur by means of thermal energy input.

An alternative to the extraction of protein concentrates is the extraction of protein isolates according to the procedure shown in the right branch of the flow chart of FIG. 2. In this process, the protein-rich flour is extracted by adding alkaline liquids with the wet flour parts precipitating. By adding acidic reagents and centrifuging, the protein extract yielded by alkaline extraction is separated into whey and protein curd. The functional properties of the curd can subsequently be manipulated in the desired manner by dilution, pasteurization, neutralization or modification. The extraction of protein isolates, too, requires a subsequent drying step.

The functional properties of proteins can also already be influenced when processing the seed, extracting the protein, or by selective modification, which occurs with the protein isolate. For this also see J. E. Kinsella's paper "Functional Properties of Soy Proteins", Journal of Am. Chem. Soc., 56 (1979), pp. 242 to 246.

The purpose of modification is to obtain protein products with selectively determined functional properties. Proteins possess, depending on their protein structure and/or pH values, good solubility or good water-binding capacity, which are particularly important when used as an additive in sausage and meat products. Especially, the water-binding capacity of proteins when used in sausage and meat products is a property of major significance. The functional property of water-binding can, for instance, be improved by selective thermal denaturing of the protein structure.

There are processes known, for instance processing lupine seeds by roasting, boiling, peeling and finely grinding, which lead to altering and determining the functional properties of the lupine flour gained in this manner. The products obtained this way are offered for binding oil and water in foodstuffs as well as for improving their texture. French patent FR 2 660 163 A1 describes such a process. However, a drawback is that the products obtained with this process possess only a limited protein content of maximally 45%. Thus, these products correspond to the natural seed composition and are not protein concentrates or protein isolates.

J. King and C. Aguirre's paper, "Functional Properties of Lupin Protein Isolates", Journal of Food Science, 50(1985), pp. 82 to 87 describes a process for extracting protein isolates from lupines and notes the possibility of modifying the functional properties of the proteins. Heating the protein samples influences both their gelling property and their water-binding capacity positively. In order, for example, to increase the gelling property of the protein isolates, the concentration of the protein isolates is raised during heating, thereby, however, leading to high viscosity of the protein sample.

Heating such high-viscous protein samples, however, harbors the difficulty of uniform heating. Therefore, indirect heating processes have been proposed, which, however, require special heat exchangers, for example coaxial heat exchangers, and consequently are expensive devices. The slow flow properties of high-viscous protein preparations and the utmost necessity of avoiding overheating, for example on the wall of the heat exchanger, contribute to the need of additional, large and therefore expensive constructions. On the other hand, reducing the viscosity of the protein preparations by adding water, would increase the cost and complexity of processing further especially during drying.

However, with the aforedescribed convective thermal heating method, one is able to attain only uniform heating of the entire volume of the protein preparation if the preparations are, if diluted with water, a light, stirrable or flowable dispersion so that the structure change can set in uniformly throughout the entire protein preparation volume. When using convective thermal heating to heat a highly concentrated protein dispersion, proteins, particularly, cake readily on the heating surfaces of the heat exchanger device because the immediate thermal input is the greatest at these contact surfaces.

Moreover, thermal convection inside the to-be-heated protein preparation is accompanied by severe temperature gradients, which counteract the uniform determination of the functional properties throughout the entire protein preparation volume.

DESCRIPTION OF THE INVENTION

The object of the present invention is to further improve a process for the gentle modification of the functional properties of a protein preparation, preferably of protein isolates or protein concentrates from vegetable seeds, by heating the protein preparation, for the production of fresh or dry products as a base material or additive for protein-containing foodstuffs, in such a manner that a defined, selective, uniform determination of the functional properties is possible throughout the entire protein preparation volume. In particular, the drawbacks related to conventional heating with thermal convection should be avoided. Furthermore, a device for heating a protein preparation gently should be provided which is inexpensive and not complicated A key element of the present invention is that a process for the gentle modification of the functional properties of a protein preparation, preferably of protein isolates or concentrates from vegetable seed, by heating the protein preparation, for the production of fresh or dry products as a base material or additive for protein-containing foodstuffs, is further improved in such a manner that the protein preparation is exposed to an electromagnetic high-frequency field by means of which the protein preparation is heated with a largely uniform temperature distribution throughout the entire volume of the protein preparation.

The present invention is based heating very slow flowing protein preparations by means of penetrating heating in order to introduce the energy input as quickly and uniformly as possible throughout the entire volume of the to-be-heated protein preparation. An element of the present invention is that the use of high-frequency fields leads to uniform thermal input throughout the entire volume of the preparation, which, in addition, can be determined directly and immediately to a defined degree by regulating the electric fields. The penetrating heating generated by high-frequency fields for a protein preparation with viscous flow behavior is also suited for products with a high solid substance content, because the energy input leads to uniform heating with no local overheating, such as for instance on the walls of the vessel. For gelling the proteins, the proteins can be directly heated with no mechanical input, such as for example a stirring device.

Preferably, dielectric heating occurs using high-frequency fields with frequencies between 10 and 40 MHz. Such HF fields permit heating protein preparations, in which proteins are distributed polydispersely as a pastose liquid or in an aqueous solution or are in a swollen or precipitated state, uniformly throughout the entire volume of the protein preparation. In particular, the solubility, viscosity, water-binding, oil-binding and/or gelling behavior as well as dispersive power of the protein can be determined in this manner.

The use of HF-fields permits heating protein preparations with a dry substance content of up to 45% with no local overheating.

Provision of a uniform heating temperature and immediate influence of the energy input in the to-be-heated protein preparation by regulating the HF energy permits heating the protein preparation over a very narrow time window to an exact as possible temperature level. Thus, selective energy input can be realized within seconds, for example, by being able to heat the protein preparation to a prescribed temperature level with a fluctuation range of few ° C. Usually heating temperatures range between 70° C. and 90° C.

An invented device for carrying out the process described in the preceding is fundamentally provided with a feed means which conveys the to-be-heated protein preparation in the heating zone. The heating means essentially comprises a hollow channel surrounded by a HF-field-penetrable material. Furthermore, an element of the present invention is that an electrode arrangement is provided which generates a homogeneous HF field inside the heating zone. Finally, a feed unit is provided which conveys the to-be-heated protein preparation through the hollow channel of the heating zone.

BRIEF DESCRIPTION OF THE DRAWINGS

The present invention is made more apparent using a preferred embodiment with reference to the following figures without the intention of limiting the scope or spirit of the overall invention.

BRIEF DESCRIPTION OF A PREFERRED EMBODIMENT

Figure 1:
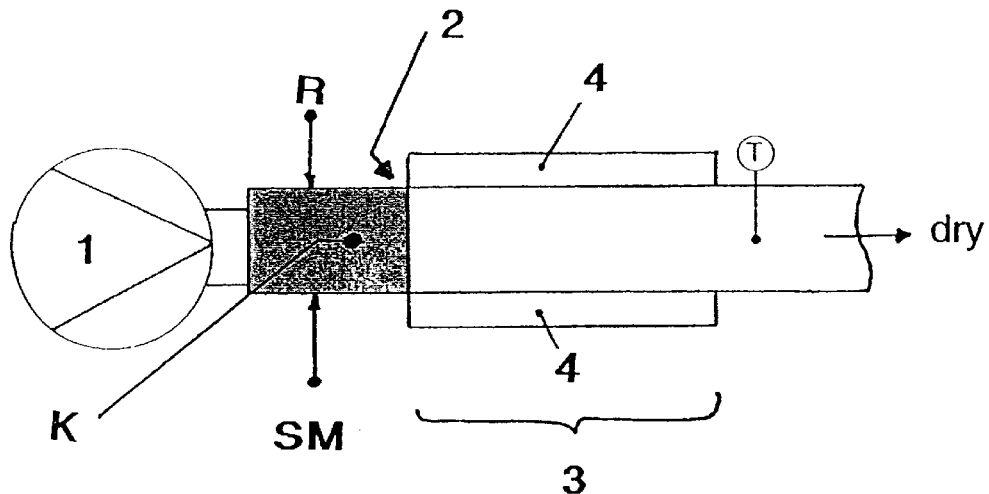
FIG. 1 illustrates a device for heating a protein preparation according to the aforedescribed process.

FIG. 1 shows a device for gentle, uniform heating of a protein preparation for defined modification of the functional properties of the protein contained in the preparation. A feed pump 1 feeds the, usually viscous, protein preparation, which for example emerges as curd from a precipitation, in the direction of a hollow channel 2, which preferably is made of quartz glass. Before the heating zone 3, the hollow channel 2 is provided with a channel region K in which the protein preparation is homogenized with the aid of a static mixer SM and/or reagents R can be added for selective modification. The heating zone 3 is limited by HF electrodes 4, which generate a homogeneous HF field inside the hollow channel 2 which functions as an enclosure of the protein preparation. Care must be taken that the to-be-heated protein preparation is conveyed in the heating zone 3 without any air inclusions, because air inclusions are isolation regions for the HF fields. Preferably, the electrodes are glued onto the hollow channel 2 made of quartz glass.

Figure 2:
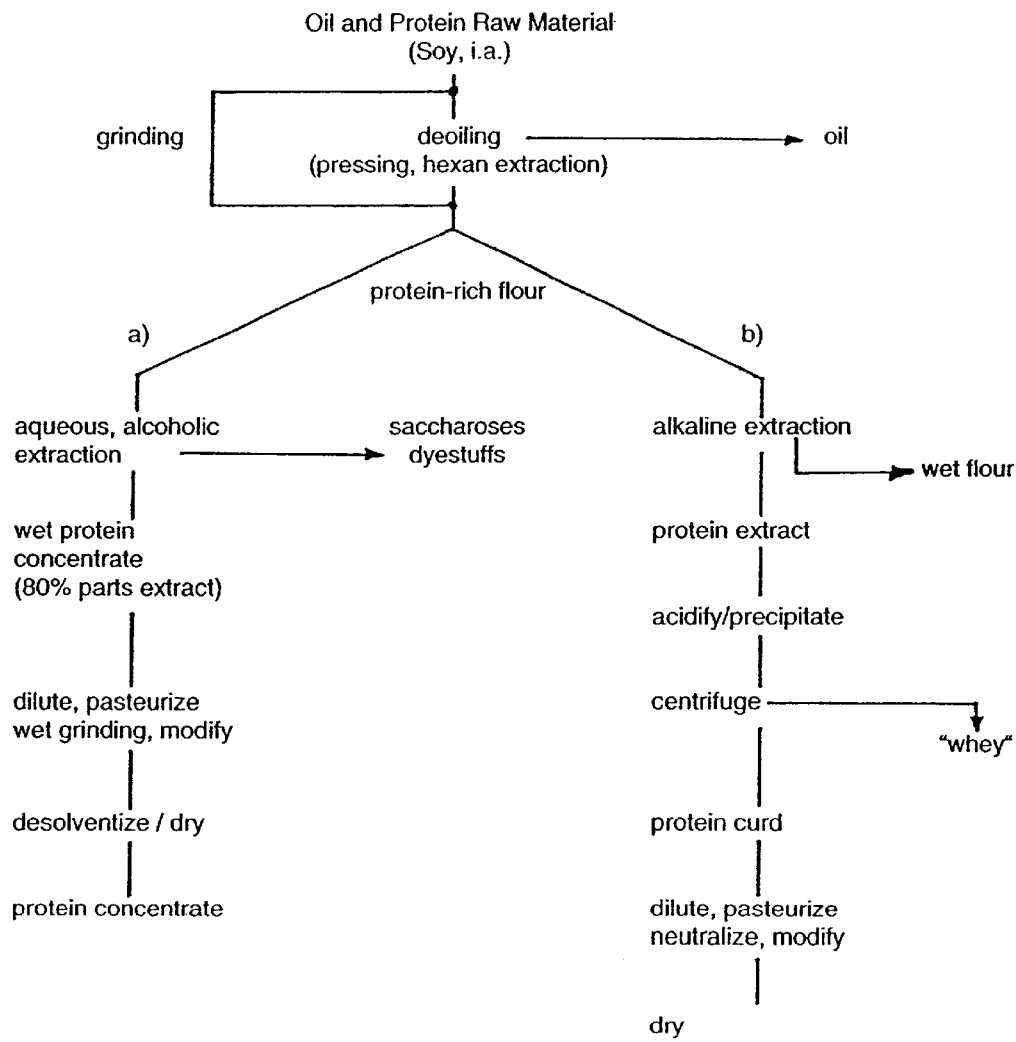
FIG. 2 illustrates a flow chart of a prior art process for extracting protein concentrates and protein isolates.

The protein preparation fed uniformly through the heating zone 3 is uniformly heated by the HF fields and, on the right side of the FIG. 2, is conveyed from the heating zone 3 for subsequent drying.

The temperatures between 70° C. and 90° C. attainable in heating zone 3 results in denaturing the protein in the protein preparation which is connected with structure changes in the protein.

With the aid of the process and device of the invention, water and energy requirements for functionalizing proteins are reduced. No dilution steps and therefore no additional energy-intensive drying steps are needed for functionalizing. Thus, the process of the invention contributes to considerable reduction in energy consumption. In addition to this, the cost and complexity of the device for uniform heating of the protein preparation is very small.

With the aid of the process of the invention cut-resistant, gels can be obtained using HF fields by employing high protein and dry substance concentrations in the sample, respectively in the protein preparation. Thus, the manner of heating with the invention in particular, permits heating high-viscous proteins without allowing shear forces due to stirring or scraping to effect the to-be-heated protein.

The duration of the thermal input is controllable by the velocity with which the to-be-heated protein preparation is conveyed through the heating zone. Moreover, another pipeline, in which the heated protein preparation can predry, can be connected following the heating zone.

Furthermore, the protein preparation can be filled in the form of protein curd into foil tubes, for example endless sheathing, and conveyed in this way through the heating zone without prior mixing. With this process, a finished, packed and pasteurized protein gel can be produced as a cut-resistant foodstuff after cooling. It is advantageous that gelling and pasteurizing occur in a single step inside the packaging, which offers the advantages of sterility.

What is claimed is:

1. A process for the gentle modification of functional properties of a protein preparation by heating said protein preparation, for the production of fresh or dry products as a base material or additive for protein-containing foodstuffs, wherein said protein preparation is a pastose fluid having a dry substance content up to 55% and being heated in an electromagnetic field with a frequency of approximately 10 to 40 MHz throughout an entire volume of the protein preparation at a uniform temperature distribution.

2. A process according to claim 1, wherein:

said functional properties are modifiable by means of said uniform heating.

3. A process according to claim 2 wherein:

said functional properties include solubility, viscosity, water-binding, oil-binding and/or gelling behavior, and dispersive power of said protein preparation.

4. A process according to claim 3, wherein:

said heating of said protein preparation is at a pH value of approximately 4 to 8 is maintained.

5. A process according to claim 4, wherein:

said protein preparation is enclosed in an enclosure during said heating which is penetrated by said electromagnetic field.

6. A process according to claim 3, wherein:

said protein preparation is enclosed in an enclosure during said heating which is penetrated by said electromagnetic field.

7. A process according to claim 2, wherein:

said heating of said protein preparation is at a pH value of approximately 4 to 8 is maintained.

8. A process according to claim 7, wherein:

said protein preparation is enclosed in an enclosure during said heating which is penetrated by said electromagnetic field.

9. A process according to claim 2, wherein:

said protein preparation is enclosed in an enclosure during said heating which is penetrated by said electromagnetic field.

10. A process according to claim 1, wherein:

during said heating of said protein preparation, a pH value of approximately 4 to 8 is maintained.

11. A process according to claim 10, wherein:

said protein preparation is enclosed in an enclosure during said heating which is penetrated by said electromagnetic field.

12. A process according to claim 1, wherein:

prior to said heating, said protein preparation is treated with reagents producing modification and/or homogenization thereof.

13. A process according to claim 12, wherein:

said protein preparation is enclosed in an enclosure during said heating which is penetrated by said electromagnetic field.

14. A process according to claim 1, wherein:

said protein preparation is heated over a given period of time during which a heating temperature of approximately 70° C. and 90° C. is reached.

15. A process according to claim 14, wherein:

said protein preparation is enclosed in an enclosure during said heating which is penetrated by said electromagnetic field.

16. A process according to claim 1, wherein:

a heating temperature is determined and a chosen temperature-dwell time spectrum in the entire volume range of said protein preparation is maintained.

17. A process according to claim 16 wherein:

the chosen temperature-dwell time spectrum is narrow and the heating temperature is determined in seconds.

18. A process according to claim 16, wherein:

said protein preparation is enclosed in an enclosure during said heating which is penetrated by said electromagnetic field.

19. A process according to claim 1, wherein:

said protein preparation is enclosed in an enclosure during said heating which is penetrated by said electromagnetic field.

20. A process according to claim 1, wherein:

said protein preparation is a protein isolate or a concentrate from vegetable seeds.

* * * * *